US006912472B2

(12) United States Patent
Mizushina et al.

(10) Patent No.: US 6,912,472 B2
(45) Date of Patent: Jun. 28, 2005

(54) METHOD OF ESTIMATING LOCATION OF ABNORMALITY IN FLUID FEED PIPELINE NETWORK

(75) Inventors: Shizuo Mizushina, Hamamatsu (JP); Atsushi Adachi, Shizuoka-ken (JP); Takahiro Fujiwara, Hamamatsu (JP)

(73) Assignee: Enegene Co., Ltd., Shizuoka-ken (JP)

( * ) Notice: Subject to any disclaimer, the term of this patent is extended or adjusted under 35 U.S.C. 154(b) by 0 days.

(21) Appl. No.: 10/430,434

(22) Filed: May 7, 2003

(65) Prior Publication Data

US 2004/0093172 A1 May 13, 2004

(30) Foreign Application Priority Data

Nov. 8, 2002 (JP) ....................................... 2002-325074
Feb. 13, 2003 (JP) ....................................... 2003-034613

(51) Int. Cl.[7] ............................................... G06F 19/00
(52) U.S. Cl. ........................................... 702/51; 702/50
(58) Field of Search ......................... 73/37, 40, 40.5 R, 73/49.1, 861.49, 49; 702/33, 35, 36, 45, 50, 51, 113, 127, 138, 1; 137/14, 15.11; 175/48

(56) References Cited

U.S. PATENT DOCUMENTS 3,359,652 A * 12/1967 Prosser et al. .............. 434/126
3,851,521 A * 12/1974 Ottenstein ................ 73/40.5 R
3,903,729 A * 9/1975 Covington ............... 73/40.5 R
4,066,095 A * 1/1978 Massa ........................ 137/486
4,206,402 A * 6/1980 Ishido ........................ 324/663
4,650,636 A * 3/1987 Sugimoto et al. ........... 376/250
5,038,614 A * 8/1991 Bseisu et al. ................. 73/592
5,272,646 A * 12/1993 Farmer ........................ 702/51
5,343,191 A * 8/1994 McAtamney ............... 340/605
5,343,737 A * 9/1994 Baumoel ................. 73/40.5 R (Continued)

FOREIGN PATENT DOCUMENTS

JP 9-43010 A 2/1997
JP 3082965 B2 6/2000

OTHER PUBLICATIONS

Wang, G; Dong, D; Fang, C; "Leak Detection for Transport Pipelines Based on Autoregressive Modeling"; IEEE Transactions on Instrumentation and Measurement; vol. 42, issue 1; Feb. 1993; pp 68–71.*

(Continued)

*Primary Examiner*—Bryan Bui
*Assistant Examiner*—Douglas N Washburn
(74) *Attorney, Agent, or Firm*—Venable LLP; Catherine M. Voorhees

(57) ABSTRACT

A method of detecting the location of a failure (e.g., a sudden leak) in a fluid pipeline network, which can be suitably used for estimation of the location of a failure in a water pipeline network, includes the steps of periodically measuring a flow rate or fluid pressure with sensors arranged at a plurality of measuring points along a pipeline in a water pipeline network; comparing a latest measured amount and a previous measured amount at each measuring point to determine if an amount of change at an arbitrary point has exceeded a predetermined value; and calculating a position at which an amount of change becomes maximum, the position being calculated from the magnitudes of the amounts of changes in respective measured values at the time of the detection. The pipeline network may be a water supply and distribution pipeline network which includes a trunk pipeline and branch pipelines.

7 Claims, 9 Drawing Sheets

U.S. PATENT DOCUMENTS

| | | | | | |
|---|---|---|---|---|---|
| 5,355,324 | A | * | 10/1994 | Zhang | 702/45 |
| 5,708,195 | A | * | 1/1998 | Kurisu et al. | 73/40.5 R |
| 6,032,699 | A | * | 3/2000 | Cochran et al. | 138/104 |
| 6,317,051 | B1 | * | 11/2001 | Cohen | 340/603 |
| 6,351,985 | B1 | * | 3/2002 | Bedwell | 73/49.8 |
| 6,389,881 | B1 | * | 5/2002 | Yang et al. | 73/40.5 A |
| 6,442,999 | B1 | * | 9/2002 | Baumoel | 73/40.5 A |
| 6,484,184 | B1 | | 11/2002 | Mizushina et al. | |
| 6,549,857 | B2 | * | 4/2003 | Fierro et al. | 702/51 |
| 2002/0116986 | A1 | * | 8/2002 | Pompa et al. | 73/49.1 |

OTHER PUBLICATIONS

Wang, G; Fang, C; Wang, K; "State Estimation and Leak Detection and Location in Pipeline"; Proceedings International Conference on Industrial Electronics and Control; vol. 1; Oct. 28–Nov. 1, 1991; pp 155–160.*

Duong, T; "Modern Scada Systems for Oil Pipelines"; Conference Record of 42nd Annual Industry Applications Society Petroleum and Chemical Industry Conference; Sep. 11–13, 1995; pp 299–305.*

* cited by examiner

METHOD OF ESTIMATING LOCATION OF ABNORMALITY IN FLUID FEED PIPELINE NETWORK

BACKGROUND OF THE INVENTION

1. Field of the Invention

The present invention relates to a method of estimating the location of a failure or the like in a fluid feed pipeline network, and more particularly relates to a method of determining the location of a failure in a fluid feed pipeline network which can be suitably used for estimation of the location of a failure in a water pipeline network.

2. Description of the Related Art

There have been various proposals with respect to monitoring abnormal conditions of a lifeline such as a water pipeline network. The Japanese Patent No. 3,082,965 discloses an invention of a method of monitoring a water pipeline and an apparatus therefor using a memory card. The object of the Japanese Unexamined Patent Application Publication No. H09-43010 is to shorten a restoration time of a system by quickly detecting the specific location of a failure in a lifeline. A number of sensors dedicated to detecting failures and the like are installed along the lifeline to collect data.

In an existing water pipeline network spread across a wide area, it is difficult to obtain data at an arbitrary time or with an arbitrary interval with sensors located at arbitrary positions. Since detection of a failure in a water pipeline network can be essentially thought to be detection of a change in a flow path resistance, such detection is achieved by detecting a change in a flow rate caused by the change in the flow path resistance. Therefore, detection of failures can be realized by installing flowmeters (ultrasonic type, watermill type, pitot-tube type, electromagnetic type, or other types of flowmeters) at desired positions. However, an existing water pipeline network has many parts that are underground, making it difficult to install flowmeters in most cases.

SUMMARY OF THE INVENTION

Based on the following principle, even when only a limited number of sensors can be installed due to the difficulty of installing a number of sensors, the present invention provides a method of estimating the location of an abnormality by periodically monitoring outputs from the sensors.

The principle of the invention will be described taking an example of a failure in a water distribution pipeline caused by an earthquake. When an earthquake damages a water distribution pipeline and a water leakage occurs, the flow rate and the water pressure in the pipeline change. Accordingly, if the flow rate and/or the water pressure is measured at finite measuring points (preferably at many locations) in a water supply and distribution pipeline network (hereinafter referred to as "the pipeline network") and obtained data is suitably analyzed, the location of a failure can be estimated. However, it is practically difficult to newly install a number of flowmeters in an existing pipeline network. On the other hand, the water pressure is not only a fundamental parameter ruling the water flow in the pipeline network, but also can be more easily measured at many measuring points by installing pressure meters on the surfaces of pipe walls. When a water leakage occurs at a certain position in the pipeline network, the water pressure distribution in the pipeline network changes. More specifically, the amount of change is thought to be greater in the vicinity of the position of the water leakage and smaller at distances therefrom. Then, the difference between water pressure values immediately after and before an occurrence of a large earthquake at each measuring point is taken and plotted on a drawing of the pipeline, thereby detecting a point at which the absolute value of the change (the amount of water pressure drop) is maximum. The location can be estimated, which is associated with the above-detected point, at which water leakage has occurred.

When a large earthquake has caused a lot damage to a water pipeline network, recovery of the pipeline network will take one to six months. To recover the pipeline network, particularly to properly carry out measures for emergent recovery, it is important to quickly and correctly estimate and realize the location of damage. If information as to in which area the location of damage lies is obtained, a skilled workforce can be dispatched to the site so that the state of the damage will be understood more specifically and emergent measures can be carried out.

It is an object of the present invention to provide a method of estimating the location of an abnormality in a fluid feed pipeline network that can offer a technology of quickly estimating the location of damage in a pipeline from information on water pressure. In other words, the method can provide emergency information.

Another object of the present invention is to provide a method of estimating the location of an abnormality in a fluid feed pipeline network that uses data at a point at which the amount of change at each measuring point becomes a maximum as data for forming either a fitting curve in a region where the amount of change gradually increases from the supply source of the fluid or a fitting curve in a region where the amount of change gradually decreases from the supply source of the fluid, and thus, the method uses a plurality of pairs of fitting curves so that the accuracy of estimation is increased.

To attain the former object, described above, in a first aspect of the present invention, there is provided a method of estimating the location of an abnormality in a fluid feed pipeline network that is comprised of the steps of periodically measuring a flow rate or a fluid pressure of a fluid by each sensor arranged at a plurality of measuring points along a pipeline in the fluid feed pipeline network; comparing a latest measured amount and a previous measured amount at each measuring point to determine if an amount of change at an arbitrary point has exceeded a predetermined value; and calculating a position at which the amount of change becomes a maximum, the position being calculated from the magnitudes of the amounts of changes in respective measured values at the time of the determination.

In a second aspect of the present invention, there is provided a method of estimating the location of the abnormality in the fluid feed pipeline network according to the above first aspect, wherein the maximum position calculating step calculates the position as a point of intersection of a fitting curve for a region where the amount of change gradually increases from a supply source of the fluid and a fitting curve for a region where the amount of change gradually decreases from the supply source of the fluid.

In a third aspect of the present invention, there is provided a method of estimating the location of the abnormality in the fluid feed pipeline network according to the above first or second aspect, wherein the fluid feed pipeline network is a water supply and distribution pipeline network, and each sensor measures a flow rate or a water pressure of city water.

In a fourth aspect of the present invention, there is provided a method of estimating the location of the abnormality in the fluid feed pipeline network according to the above third aspect, wherein the water supply and distribution pipeline network comprises a trunk pipeline and branch pipelines joined to the trunk pipeline.

In a fifth aspect of the present invention, there is provided a method of estimating the abnormal position in the fluid feed pipeline network according to the above third aspect, wherein in a case that an abnormality at a junction section of a branch pipeline or an abnormality in a part downstream of the junction section of the branch pipeline is estimated from the position at which the amount of change becomes the maximum, the method identifies one or more branch pipelines in the order of being closer to the estimated distance at which the amount of change becomes the maximum.

In a sixth aspect of the present invention, there is provided a method of estimating the location of the abnormality in the fluid feed pipeline network according to the above third aspect, wherein in a case that an abnormality of a trunk line is estimated from the position at which the amount of change becomes the maximum, the position at which the amount of change becomes the maximum is estimated to be the position of an abnormality of the trunk line.

In a seventh aspect of the present invention, there is provided a method of estimating the location of the abnormality in the fluid feed pipeline network according to the above third aspect, wherein each sensor is located at a position at which an air valve or a fire hydrant is provided in the water supply and distribution pipeline network.

In an eighth aspect of the present invention, there is provided a method of estimating the location of the abnormality in the fluid feed pipeline network according to the above second aspect, wherein the data at a point at which the amount of change at each measuring point becomes a maximum is used as data that forms either the fitting curve for the region where the amount of change gradually increases from the supply source of the fluid or the fitting curve for the region where the amount of change gradually decreases from the supply source of the fluid.

In a ninth aspect of the present invention, there is provided a method of estimating the location of the abnormality in the fluid feed pipeline network according to the above second aspect that is comprised of the steps of calculating a first minimal value of pressure difference, the first minimal value of pressure difference being obtained from a point of intersection of the fitting curve for the region where the amount of change gradually increases from the supply source of the fluid, wherein the data at a point at which the amount of change at each measuring point becomes a maximum is used as data to determine the fitting curve for the region where the amount of change increases, and the other fitting curve; calculating a second minimal value of pressure difference, the second minimal value of pressure difference being obtained from a point of intersection of the fitting curve for the region where the amount of change gradually decreases from the supply source of the fluid, wherein the data at the point at which the amount of change at each measuring point becomes the maximum is used as data to determine the fitting curve for the region where the amount of change decreases, and the other fitting curve; calculating a third minimal value of pressure difference, the third minimal value of pressure difference being obtained from a point of intersection of the two fitting curves, wherein the data at the point at which the amount of change at each measuring point becomes the maximum is used as both data to form the fitting curve for the region where the amount of change gradually increases from the supply source of the fluid and data to form the fitting curve for the region where the amount of change gradually decreases from the supply source of the fluid; comparing the first, the second, and the third minimal values of pressure difference and selecting a distance at which pressure difference is greatest; and determining the distance at which pressure difference is greatest as the location of the abnormality.

In a tenth aspect of the present invention, there is provided a method of estimating the location of the abnormality in the fluid feed pipeline network according to the above eighth or ninth aspect that is further comprised the step of calculating a pipe pressure that corresponds to the distance at which pressure difference is greatest, wherein the pipe pressure is calculated from the distance, and the distance corresponds to the point of intersection of the two fitting curves in the case of the eighth aspect.

In an eleventh aspect of the present invention, there is provided a method of estimating the location of the abnormality in the fluid feed pipeline network according to the above eighth or ninth aspect, wherein the fluid feed pipeline network is a water supply and distribution pipeline network, and each sensor measures a flow rate or a water pressure of city water.

In a twelfth aspect of the present invention, there is provided a method of estimating the location of the abnormality in the fluid feed pipeline network according to the above eleventh aspect, wherein the water supply and distribution pipeline network comprises a trunk pipeline and a branch pipelines joined to the trunk pipeline.

In a thirteenth aspect of the present invention, there is provided a method of estimating the location of the abnormality in the fluid feed pipeline network according to the above eleventh aspect, wherein each sensor is located at a position at which an air valve or a fire hydrant is provided in the water supply and distribution pipeline network.

DESCRIPTION OF THE PREFERRED EMBODIMENTS

An embodiment of the present invention will be described below with reference to the accompanying drawings and others.

Configuration of Pipeline Network of Waterworks

Figure 1:
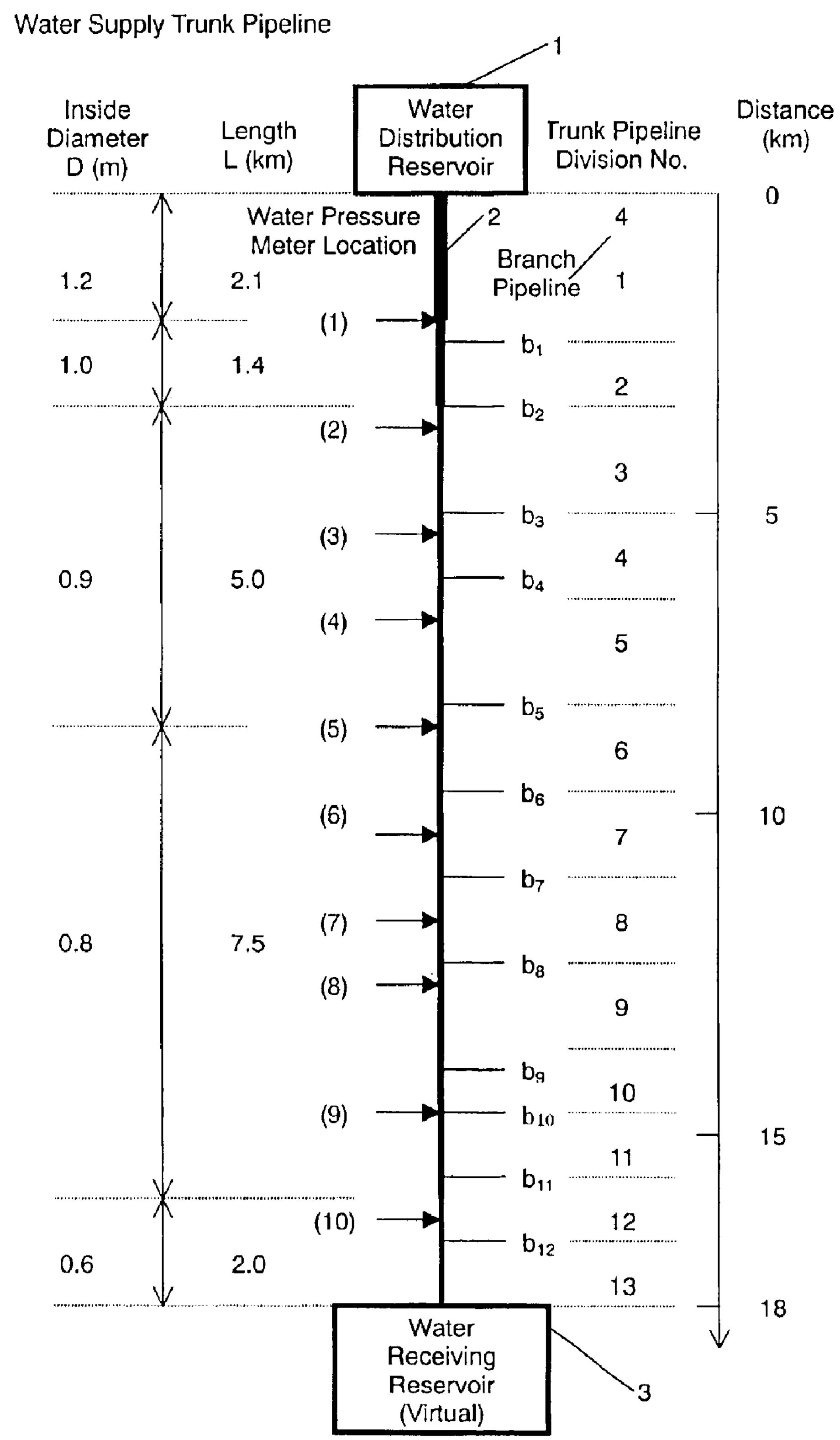
FIG. 1 is a schematic diagram showing a model of a trunk pipeline for water supply according to an embodiment of the present invention.

FIG. 1 is a schematic diagram showing a model of a trunk pipeline for water supply according to an embodiment of the present invention. A water pipeline network is, in brief, constructed by a trunk pipeline 2, sub-pipelines or branch pipelines, and a water distribution pipeline network (not shown). The primary role of the trunk pipeline 2 is to transport a large amount of water from a water distributing reservoir 1 at a filtration plant to distances of 10 to 30 km. Between both ends, the trunk pipeline 2 is joined to the sub-pipelines or the branch pipelines at various points, and water is supplied to the water distribution pipeline network to be supplied therethrough to users connected to the water distribution pipeline network. The trunk pipeline 2 constructs the network, wherein water in pipelines mostly flows from the water distributing reservoir 1 at the filtration plant in the upper stream to a city area downstream.

The operation state described above can be approximately represented by a result of analysis based on the model of a trunk pipeline as exemplarily shown in FIG. 1. Reference symbols $b_1$ to $b_{12}$ in FIG. 1 denote the sub-pipelines and the branch pipelines joined to the trunk pipeline, wherein the sub-pipelines and the branch pipelines are referred to as "branch pipelines 4 ($b_1$ to $b_{12}$)".

Measuring Water Pressure

Water pressure meters are installed with an approximate interval of 1 to 2 km in the trunk pipeline to measure water pressure in the trunk pipeline. In the model shown in FIG. 1, water pressure meters are installed at ten positions denoted by reference numerals 1 to 10. In the present invention, data that is obtained by water pressure meters closely associated with the flow rate and is correspondent to the flow rate is used. The water pressure meters can be located at installation positions of existing air valves or fire hydrants. As a matter of fact, the installation intervals can be determined by using positions allowing installation (or easy installation) or positions of existing installations. It is not required that the intervals are equal, and it is even possible that two or more branch pipelines are located between an interval.

Collection of Measured Values

Water pressure is measured periodically with an interval of several minutes, and the measured data is stored in a recording device provided in an administration center or the like as well as information on measuring time. In the administration center, water pressure is measured for each collection of measured data as follows:

water pressure difference=latest measured water pressure−previously measured water pressure When this difference is within a variation range based on an amount of water usage estimated for a normal use, it is determined that there is no abnormality. The above-described data can be easily collected online, and a database network system disclosed in U.S. Pat. No. 6,484,184 can be used to obtain the data.

Estimation of Disaster Occurrence

It is assumed below that an earthquake ruptures one of the branch pipelines $b_1$ to $b_{12}$ to cause a great amount of water leakage. Then, the water leakage changes water pressure in the trunk pipeline. The recording device described above records the values of water pressure measured on the trunk pipeline before and immediately after the occurrence of the water leakage. Water pressure difference is calculated just after water leakage as follows:

water pressure difference=water pressure just after water leakage occurrence−water pressure just before earthquake occurrence When water pressure difference at an arbitrary measuring point exceeds a change estimated for a normal use, it is estimated that a disaster has occurred. All the above described estimation and successive processing are executed by a computer in real time.

Determination of Water Pressure difference Distribution

Figure 2:
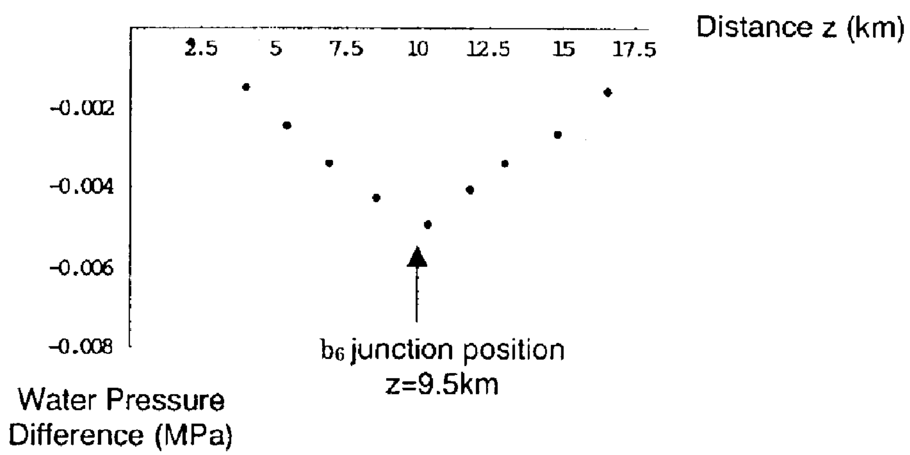
FIG. 2 is a graph showing water pressure difference in the case that a branch pipeline $b_6$ is ruptured in the above model.

When an occurrence of a disaster has been estimated, data of water pressure difference at each point is plotted along the length of the pipeline to obtain water pressure difference data as presented in FIG. 2 as an example.

Estimation of Damaged Position

Figure 3:
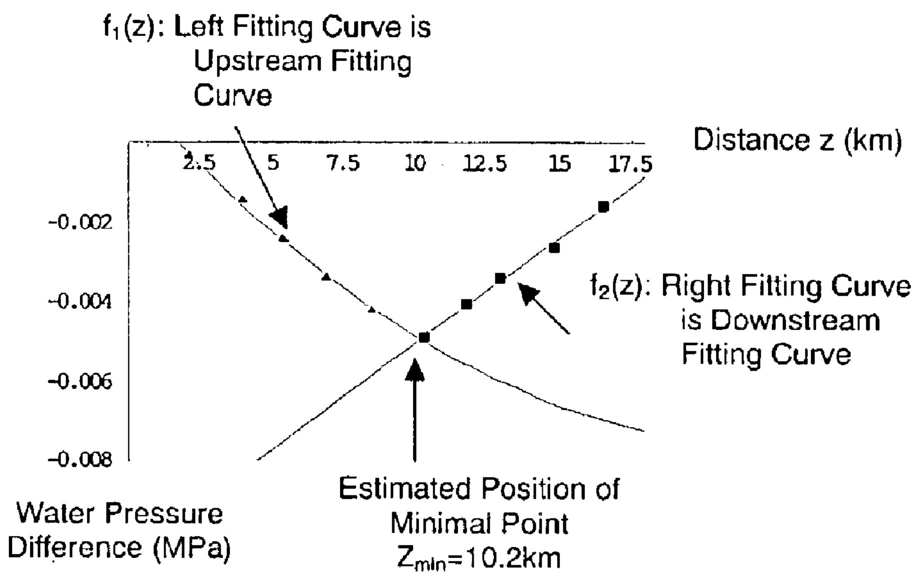
FIG. 3 is a graph showing a method of determining the minimal point of water pressure difference in the case that the branch pipeline $b_6$ is ruptured in the above model.

Curves are applied to the data of water pressure difference shown in FIG. 2 respectively on the left side and the right side of the peak value (FIG. 3). The point of intersection of the applied two curves gives an estimated position of the minimal point of water pressure difference (maximal change). In FIG. 3, the minimal point is located 10.2 km from the water distribution reservoir. This point is given by the point of intersection of the left fitting curve $f_1(z)$ and the right fitting curve $f_2(z)$ as shown in FIG. 3. A branch pipeline joined at a position closest to this point is estimated to be the ruptured branch pipeline. The water pressure difference data in FIG. 2 is generated by numerical simulation with an assumption that $b_6$ in FIG. 1 has been ruptured. The distance from the water distribution reservoir to the junction point of the branch pipeline $b_6$ is 9.5 km. In this example, the procedure to detect the junction position of a ruptured branch pipeline from an estimated position of a minimal point of the water pressure difference is as follows.

Branch pipeline junction positions on the trunk pipeline are previously known from a diagram of the pipeline network. In the case of the model in FIG. 1, the junction position of the branch pipeline $b_6$ is at z=9.5 km. The junction position of the adjacent branch pipeline $b_5$ is at $z=8.3$ km, and the junction position of the adjacent branch pipeline $b_7$ is at $z=11.0$ km. The estimated position of the minimal point of the water pressure difference is at $z_{min}=10.2$ km according to FIG. 3.

The difference between the junction position of the branch pipeline $b_5$ and the estimated position of the minimal point of the water pressure difference is $8.3-10.2=-1.9$ km. The difference between the junction position of the branch pipeline $b_6$ and the estimated position of the minimal point of the water pressure difference is $9.5-10.2=-0.7$ km. The difference between the junction position of the branch pipeline $b_7$ and the estimated position of the minimal point of the water pressure difference is $11.0-10.2=0.8$ km. Therefore, the probability of a rupture of a branch pipeline is greater in the order of the branch pipelines $b_6$, $b_7$, and $b_5$.

Figure 4:
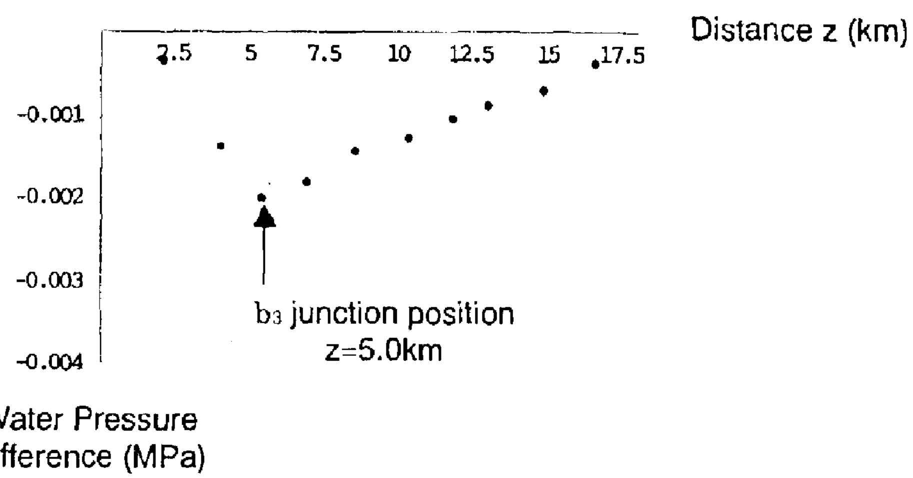
FIG. 4 is a graph showing water pressure difference in the case that a branch pipeline $b_3$ is ruptured in the above model.
Figure 5:
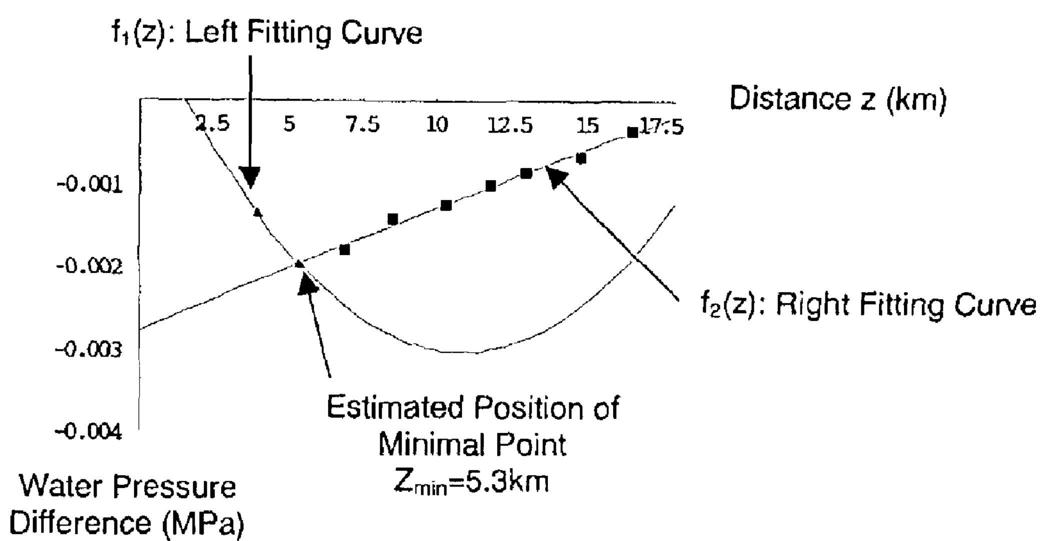
FIG. 5 is a graph showing a method of determining a minimal point of water pressure difference in the case that the branch pipeline $b_3$ is ruptured in the above model.

Next, another example of damage will be described with reference to FIGS. 4 and 5. Similarly, under the assumption that the branch pipeline $b_3$ has been ruptured, an example of water pressure difference data (in FIG. 4) and an estimated position 5.3 km of a minimal point of the water pressure difference (in FIG. 5) are shown. This minimal point is given by the point of intersection of the left fitting curve $f_1(z)$ and the right fitting curve $f_2(z)$ as shown in FIG. 5. The junction position of the branch pipeline $b_3$ to the trunk pipeline is at 5.0 km.

In this example, the junction position of the branch pipeline $b_3$ is at $z=5.0$ km. The junction position of the adjacent branch pipeline $b_2$ is at $z=3.5$ km, and the junction position of the adjacent branch pipeline $b_4$ is at $z=6.3$ km. The estimated position of the minimal point of the water pressure difference is at $Z_{min}=5.3$ km according to FIG. 5.

The difference between the junction position of the branch pipeline $b_2$ and the estimated position of the minimal point of the water pressure difference is $3.5-5.3=-1.8$ km. The difference between the junction position of the branch pipeline $b_3$ and the estimated position of the minimal point of the water pressure difference is $5.0-5.3=-0.3$ km. The difference between the junction position of the branch pipeline $b_4$ and the estimated position of the minimal point of the water pressure difference is $6.3-5.3=1.0$ km. Therefore, the probability of a rupture of a branch pipeline is greater in the order of the branch pipelines $b_3$, $b_4$, and $b_2$.

Figure 6:
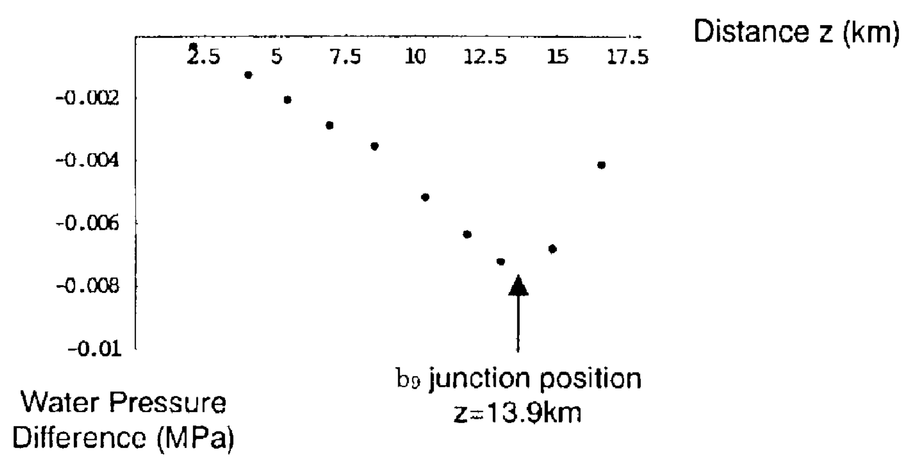
FIG. 6 is a graph showing water pressure difference in the case that a branch pipeline $b_9$ is ruptured in the above model.
Figure 7:
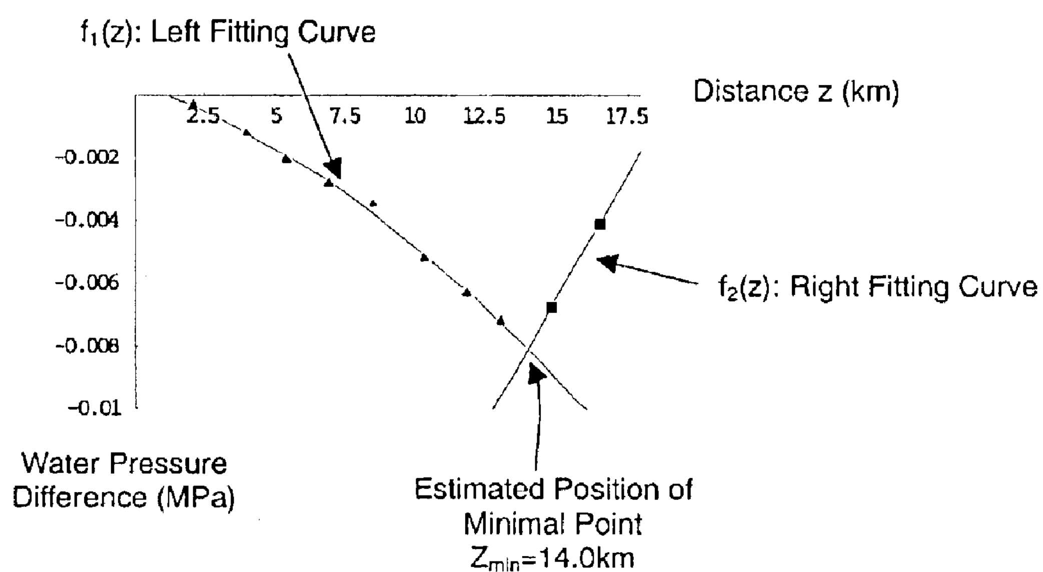
FIG. 7 is a graph showing a method of determining the minimal point of water pressure difference in the case that the branch pipeline $b_9$ is ruptured in the above model.

Next, still another example of a disaster will be described with reference to FIGS. 6 and 7. Under the assumption that the branch pipeline $b_9$ has been ruptured, an example of water pressure difference data (in FIG. 6) and an estimated position 14.0 km of a minimal point of the water pressure difference (in FIG. 7) are shown. This minimal point is given by the point of intersection of the left fitting curve $f_1(z)$ and the right fitting curve $f_2(z)$ as shown in FIG. 7. The junction position of the branch pipeline $b_9$ to the trunk pipeline is at 13.9 km.

In this example, the junction position of the branch pipeline $b_9$ is at $z=13.9$ km. The junction position of the adjacent branch pipeline $b_8$ is at $z=12.5$ km, and the junction position of the adjacent branch pipeline $b_{10}$ is at $z=14.8$ km. The estimated position of the minimal point of the water pressure difference is at $z_{min}=14.0$ km according to FIG. 7.

The difference between the junction position of the branch pipeline $b_8$ and the estimated position of the minimal point of the water pressure difference is $12.5-14.0=-1.5$ km. The difference between the junction position of the branch pipeline $b_9$ and the estimated position of the minimal point of the water pressure difference is $13.9-14.0=-0.1$ km. The difference between the junction position of the branch pipeline $b_{10}$ and the estimated position of the minimal point of the water pressure difference is $14.8-14.0=0.8$ km. Therefore, the probability of a rupture of a branch pipeline is greater in the order of the branch pipelines $b_9$, $b_{10}$, and $b_8$.

By the above numerical simulation, the principle of the present invention has been verified. In this way, the method of estimating a junction position of a branch pipeline ruptured by an earthquake and a trunk pipeline thereof according to data of water pressure measured by water pressure meters installed on the trunk water supply pipeline is realized. This trunk pipeline model is based on a real urban water supply system. A test for simulation of a rupture with measured data collected by water pressure meters located in the above described existing system and with an instant opening of a specific position of a trunk line network (river-crossing waterway) was carried out, resulting in showing an extremely high accuracy.

Next, a procedure of estimation modified from the above-described procedure of estimation will be described below. The modified procedure for estimation is same as the above-described procedure for estimation in that a left fitting curve corresponding to the upstream part and a right fitting curve corresponding to the downstream part are generated so that a minimal point of the water pressure difference is given by the point of the intersection. In this modified procedure, however, the following three types of minimal values of water pressure difference are obtained depending on which fitting curve is to include the minimum data of water pressure difference.

(i) With determination of the left fitting curve with the assumption that the minimum data of water pressure difference is handled as upstream data, a first minimal value of water pressure difference estimated from the point of intersection with the right fitting curve is obtained.

(ii) With determination of the right fitting curve with the assumption that the minimum data of water pressure difference is handled as downstream data, a second minimal value of water pressure difference estimated from the point of intersection with the left fitting curve is obtained.

(iii) With determination of the left fitting curve with the assumption that the minimum data of water pressure difference is handled as the upstream data, and with determination of the right fitting curve with the assumption that the minimum data of water pressure difference is handled as the downstream data, a third minimal value of water pressure difference estimated from the point of intersection of the fitting curves is obtained.

First of all, out of the above minimal values, a solution (point of intersection) with estimation of a minimal value higher than the minimum data of water pressure difference is rejected. Next, the lowest of the minimal values of the water pressure difference obtained by (i), (ii), and (iii) is adopted as the estimated point of the minimal position. Then, a water pressure difference $P_{min}$ that gives a minimum of the minimal value of the water pressure difference is obtained from the distance of the estimated point of the minimal position, using the fitting curve P that gives the estimated point of the minimal position.

Modified Embodiment A

A case that the branch pipeline $b_6$ is damaged (or the branch pipeline is opened.) will be described as Embodiment A.

Figure 8:
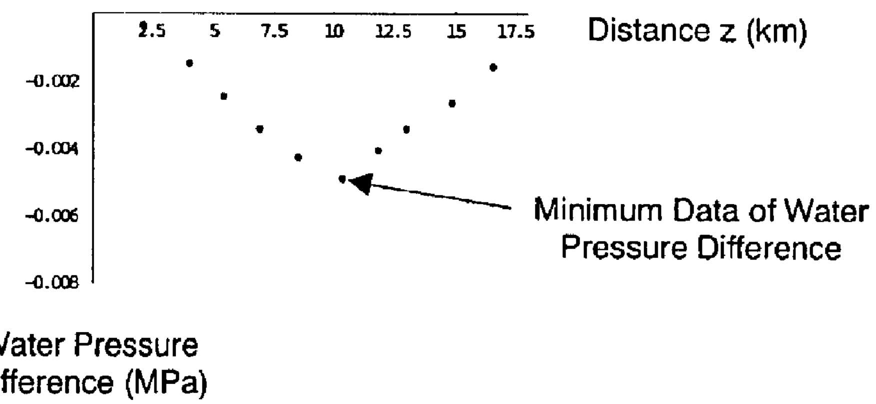
FIG. 8 is a graph showing data of water pressure difference useful in explaining a modified method of estimating a ruptured position in the case with the assumption that that branch pipeline $b_6$ is ruptured in the above model.
Figure 9:
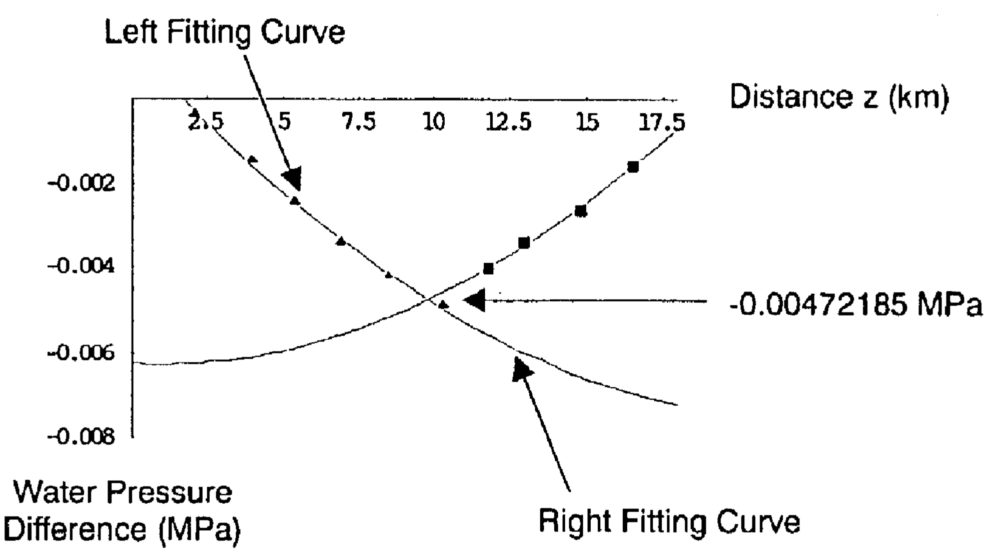
FIG. 9 is a graph showing a fitting curve in a first case (i) in Embodiment A (The branch pipeline $b_6$ is ruptured.) of the modified method of estimating the ruptured position.

Data of the distribution of water pressure difference in the case that the branch pipeline $b_6$ is ruptured (or the base part is opened.) is shown in FIG. 8. The minimum value of the water pressure difference of the data is −0.00488 MPa. FIG. 9 shows the case of the above (i). The left fitting curve $f_{61,left}(z)$ is determined with the assumption that the minimum data of water pressure difference is handled as the upstream data, and the distance z (9.7999) of the point of intersection with the right fitting curve $f_{61,right}(z)$ is obtained. Then, a first minimal value $P_{min}$ of water pressure difference (−0.00472185 MPa) is obtained from this distance, using Expressions 1. Associated expressions and results of the calculation are shown in Expressions 1.

Expressions 1

Left fitting curve $$f_{61,left}(z)=0.0013204-0.000787858z+0.0000174794z^2$$

Right fitting curve $$f_{61,right}(z)=-0.00623123-0.0000325313z+0.0000190361z^2$$

Minimal position of water pressure difference $$f_{61,left}(z)=f_{61,right}(z)\rightarrow Z=9.7999$$

Minimal value of water pressure difference $$P_{min}=f_{61}(9.7999)=-0.00472185\text{ MPa}$$

Since −0.00472185 MPa>−0.00488 MPa, this solution is rejected.

Figure 10:
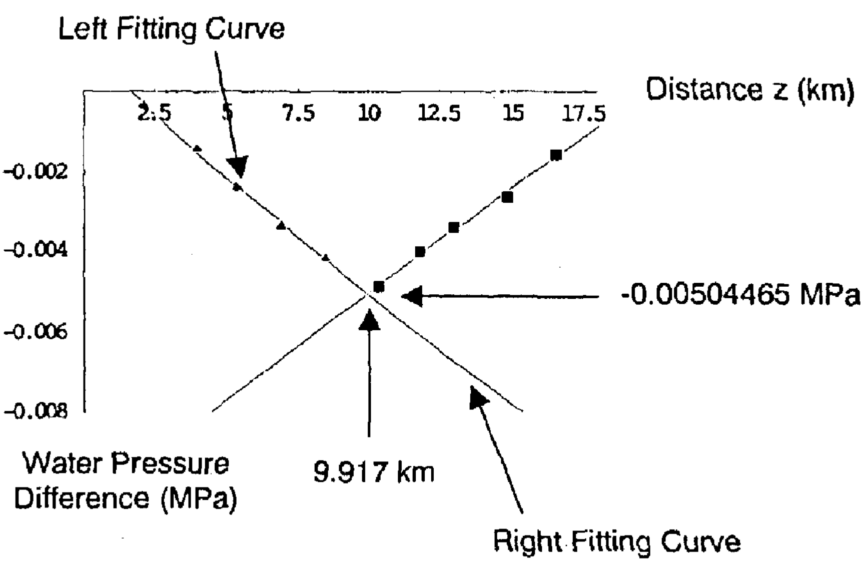
FIG. 10 is a graph showing a fitting curve in a second case (ii) in Embodiment A (The branch pipeline $b_6$ is ruptured.) of the modified method of estimating the ruptured position.

FIG. 10 shows the case of the above (ii). The right fitting curve $f_{62,right}(z)$ is determined with the assumption that the minimum data of water pressure difference is handled as the downstream data, and the distance z (9.917) of the point of intersection with the left fitting curve $f_{62,left}(z)$ is obtained. Then, a second minimal value $P_{min}$ of water pressure difference (−0.00504465 MPa) is obtained from this distance, using Expressions 2. Associated expressions and results of the calculation are shown in Expressions 2.

Expressions 2

Left fitting curve $$f_{62,left}(z)=0.00108418-0.000667571z+4.99779\times10^{-6}z^2$$

Right fitting curve $$f_{62,right}(z)=-0.0104808+0.000564365z-1.63408\times10^{-6}z^2$$

Minimal position of water pressure difference $$f_{62,left}(z)=f_{62,right}(z)\rightarrow Z=9.91708$$

Minimal value of water pressure difference $$P_{min}=f_{62}(9.91708)=-0.00504465\text{ MPa}$$

Figure 11:
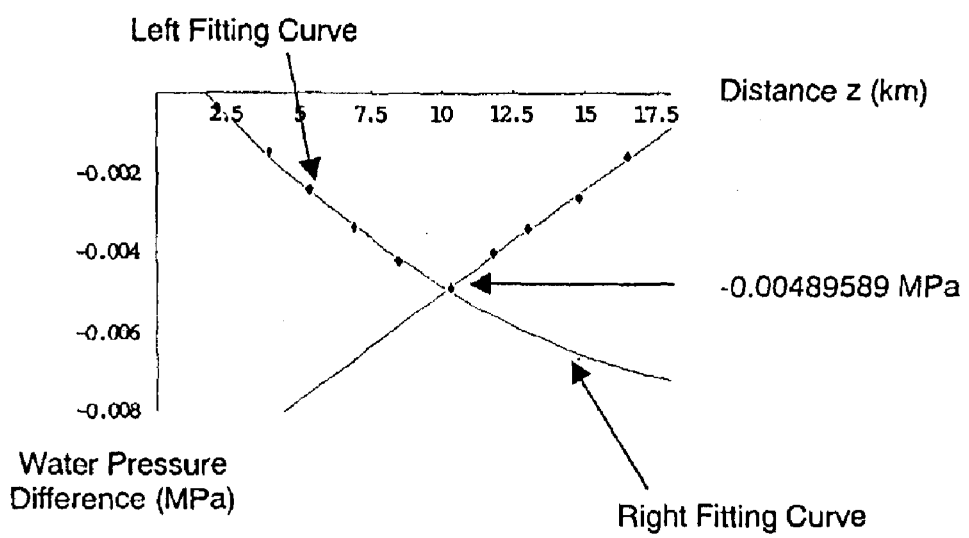
FIG. 11 is a graph showing a fitting curve in a third case (iii) in Embodiment A (The branch pipeline $b_6$ is ruptured.) of the modified method of estimating the ruptured position.

FIG. 11 shows the case of the above (iii). The fitting curves $f_{63,left}(z)$ and $f_{63,right}(z)$ are determined with the assumption that the minimum data of water pressure difference is handled as the upstream and the downstream data. Then, the distance z (10.197) of the point of intersection of the both fitting curves is obtained. And then, a third minimal value $P_{min}$ of water pressure difference (−0.00489589 MPa) is obtained from this distance, using Expressions 3. Associated expressions and results of the calculation are shown in Expressions 3.

Expressions 3

Left fitting curve $$f_{63,left}(z)=0.0013204-0.000787858z+0.0000174794z^2$$

Right fitting curve $$f_{63,right}(z)=-0.0104808+0.000564365z-1.63408\times10^{-6}z^2$$

Minimal position of water pressure difference $$f_{63,left}(z)=f_{63,right}(z)\rightarrow Z=10.197$$

Minimal value of water pressure difference $$P_{min}=f_{63}(10.197)=-0.00489589\text{ MPa}$$

Results of Estimation in Embodiment A

The above described (i) was rejected (corresponding to FIG. 9), and the minimal value of water pressure difference in the case of (ii) out of (ii) and (iii) (corresponding to FIGS. 10 and 11) is the minimum value. Therefore, $$z=9.91708\text{ km}$$

that is estimated by (ii) is determined to be the estimated position of the junction point of the ruptured branch pipeline.

The junction point (actual measured distance) of the branch pipeline $b_6$ used in the model calculation is z=9.5 km. For reference, the estimated position by (iii) is $$Z=10.197\text{ km.}$$

Accordingly, the estimated position by (ii) is the closest to the distance 9.5 km of the junction point of the branch pipeline $b_6$ set by the model.

Modified Embodiment B

A case that the branch pipeline $b_3$ is damaged (or the branch pipeline is opened.) will be described as Embodiment B.

Figure 12:
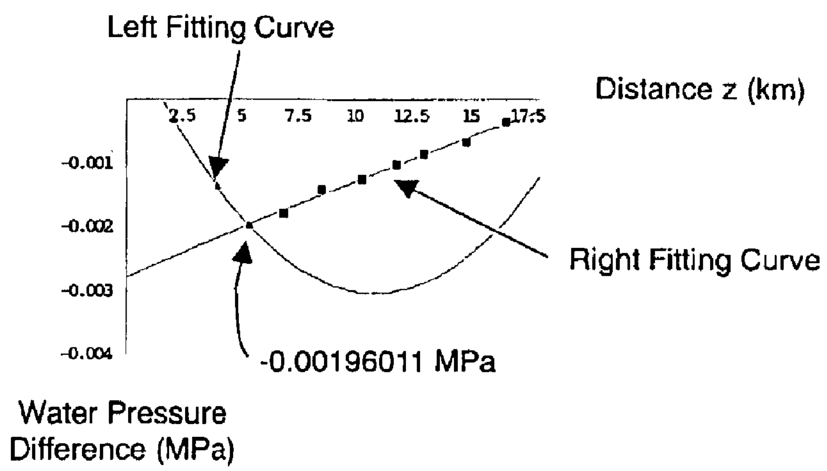
FIG. 12 is a graph showing a fitting curve in a first case (i) in Embodiment B (The branch pipeline $b_3$ is ruptured.) of the modified method of estimating the ruptured position.

The minimum value of the water pressure difference of the data is −0.00198 MPa. FIG. 12 shows the case of the above (i). The left fitting curve $f_{31,left}(z)$ is determined with the assumption that the minimum data of water pressure difference is handled as upstream data, and the distance z (5.34873) of the point of intersection with the right fitting curve $f_{31,right}(z)$ is obtained. Then, a first minimal value $P_{min}$ of water pressure difference (−0.00196011 MPa) is obtained from this distance, using Expressions 4. Associated expressions and results of the calculation are shown in Expressions 4.

Expressions 4

Left fitting curve $$f_{31,left}(z)=0.00113813-0.000768751z+0.0000354295z^2$$

Right fitting curve $$f_{31,right}(z)=-0.0027828+0.000157652z-7.17977\times10^{-7}z^2$$

Minimal position of water pressure difference $$f_{31,left}(z)=f_{31,right}(z)\rightarrow Z=5.34873$$

Minimal value of water pressure difference $$P_{min}=f_{31}(5.34873)=-0.00196011\text{ MPa}$$

Since −0.00196011 MPa>−0.00198 MPa, this solution is rejected.

Figure 13:
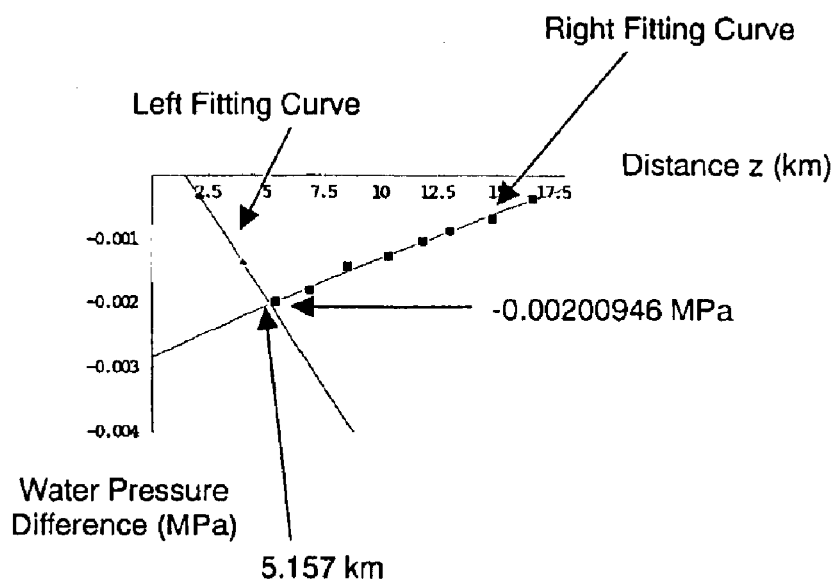
FIG. 13 is a graph showing a fitting curve in a second case (ii) in Embodiment B (The branch pipeline $b_3$ is ruptured.) of the modified method of estimating the ruptured position.

FIG. 13 shows the case of the above (ii). The right fitting curve $f_{32,right}(z)$ is determined with the assumption that the minimum data of water pressure difference is handled as downstream data, and the distance z (5.157) of the point of intersection with the left fitting curve $f_{32,left}$ (z) is obtained. Then, a second minimal value $P_{min}$ of water pressure difference (−0.00200946 MPa) is obtained from this distance, using Expressions 2. Associated expressions and results of the calculation are shown in Expressions 5.

Expressions 5

Left fitting curve $$f_{32,left}(z)=0.000840526-0.000552632z$$

Right fitting curve $$f_{32,right}(z)=-0.00284863+0.000168689z-1.15738\times10^{-6}z^2$$

Minimal position of water pressure difference $$f_{32,left}(z)=f_{32,right}(z)\rightarrow Z=5.15712$$

Minimal value of water pressure difference $$P_{min}=f_{32}(5.15712)=-0.00200946\text{ MPa}$$

Figure 14:
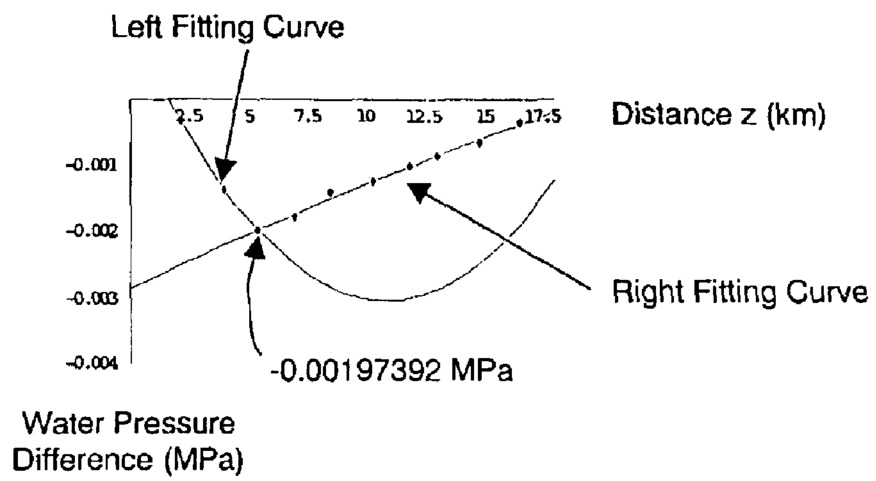
FIG. 14 is a graph showing a fitting curve in a third case (iii) in Embodiment B (The branch pipeline $b_3$ is ruptured.) of the modified method of estimating the ruptured position.

FIG. 14 shows the case of the above (iii). The fitting curves $f_{33,left}(z)$ and $f_{33,right}(z)$ are determined with the assumption that the minimum data of water pressure difference is handled as upstream and downstream data. The distance z (5.38427) of the point of intersection of the both fitting curves is obtained. Then, a third minimal value $P_{min}$ of water pressure difference (−0.00197392 MPa) is obtained from this distance, using Expressions 6. Associated expressions and results of the calculation are shown in Expressions 6.

Expressions 6

Left fitting curve $$f_{33,left}(z)=0.00113813-0.000768751z+0.0000354295z^2$$

Right fitting curve $$f_{33,right}(z)=-0.00284863+0.000168689z-1.15738\times10^{-6}z^2$$

Minimal position of water pressure difference $$f_{33,left}(z)=f_{33,right}(z)\rightarrow Z=5.38427$$

Minimal value of water pressure difference $$P_{min}=f_{33}(5.38427)=-0.00197392\text{ MPa}$$

Results of Estimation in Embodiment B

The above described (i) is rejected (corresponding to FIG. 9), and the minimal value of water pressure difference in the case of (ii) out of (ii) and (iii) (corresponding to FIGS. 10 and 11) is the minimum value. Therefore, $$z=5.15712\text{ km}$$

that is estimated by (ii) is determined to be the estimated position of the junction point of the ruptured branch pipeline.

The junction point of the branch pipeline $b_3$ used in the model calculation is z=5.0 km. For reference, the estimated position by (iii) is $$Z=5.38427\text{ km.}$$

Accordingly, the estimated position by (ii) is the closest to the distance 5.0 km of the junction point of the branch pipeline $b_3$ set by the model.

Modified Embodiment C

A case that the branch pipeline $b_9$ is damaged (or the branch pipeline is opened.) will be described as Embodiment C.

Figure 15:
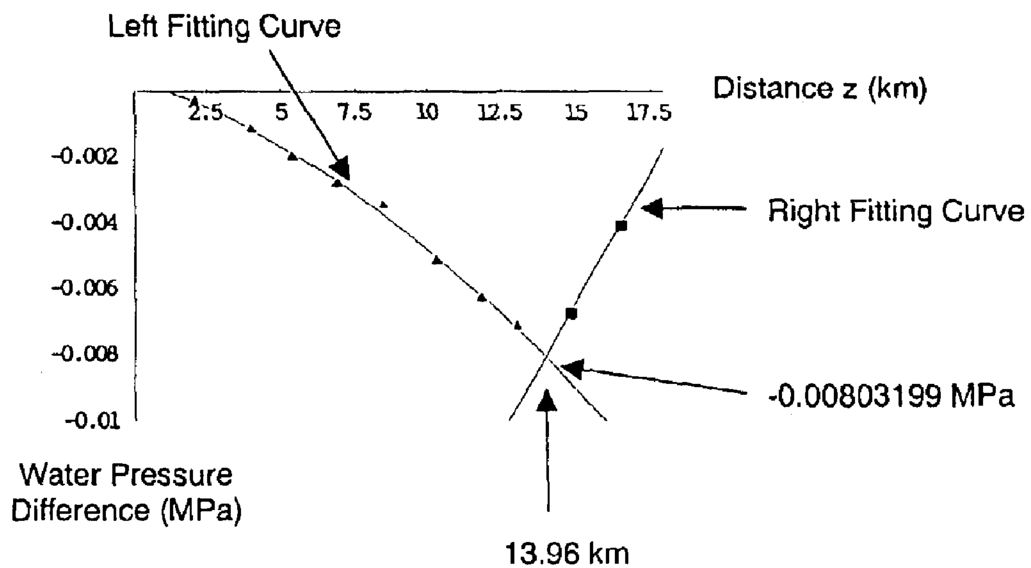
FIG. 15 is a graph showing a fitting curve in a first case (i) in Embodiment C (The branch pipeline $b_9$ is ruptured.) of the modified method of estimating the ruptured position.

The minimum value of the water pressure difference of the data is −0.00713 MPa. FIG. 15 shows the case of the above (i). The left fitting curve $f_{91,left}(z)$ is determined with the assumption that the minimum data of water pressure difference is handled as upstream data, and the distance z (13.96) of the point of intersection with the right fitting curve $f_{91,right}(z)$ is obtained. Then, a first minimal value $P_{min}$ of water pressure difference (−0.00803199 MPa) is obtained from this distance, using Expressions 7. Associated expressions and results of the calculation are shown in Expressions 7.

Expressions 7

Left fitting curve $$f_{91,left}(z)=0.000414769-0.000308758z-0.0000212333z^2$$

Right fitting curve $$f_{91,right}(z)=-0.0297906+0.00155882z$$

Minimal position of water pressure difference $$f_{91,left}(z)=f_{91,right}(z)\rightarrow Z=13.9583$$

Minimal value of water pressure difference $$P_{min}=f_{91}(13.9583)=-0.00803199\text{ MPa}$$

Figure 16:
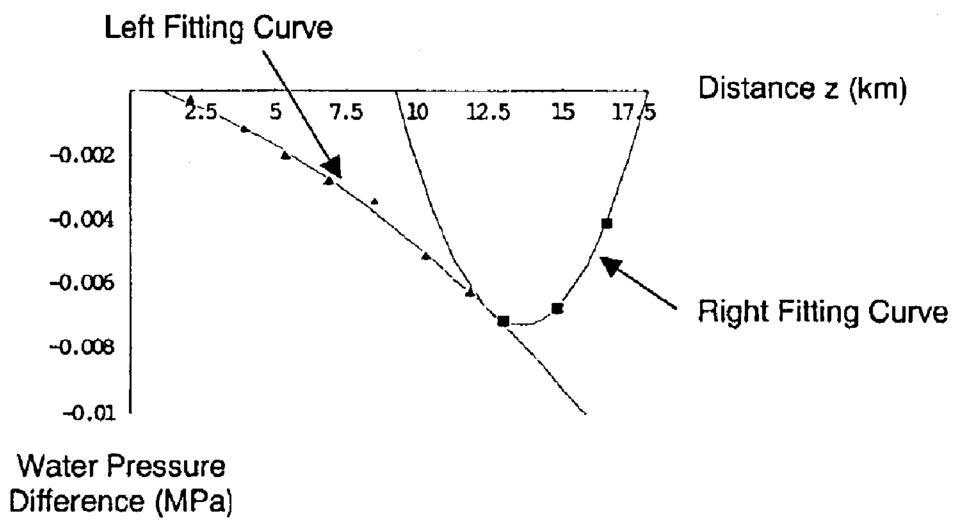
FIG. 16 is a graph showing a fitting curve in a second case (ii) in Embodiment C (The branch pipeline $b_9$ is ruptured.) of the modified method of estimating the ruptured position.

FIG. 16 shows the case of the above (ii). The right fitting curve $f_{92,right}(z)$ is determined with the assumption that the minimum data of water pressure difference is handled as downstream data, and the distance z of the point of intersection with the left fitting curve $f_{92,left}(z)$ is obtained. Since the estimated value of the minimal position of water pressure difference is a complex number, the solution of a second minimal value of water pressure difference is rejected. Associated expressions and results of the calculation are shown in Expressions 8.

Expressions 8

Left fitting curve $$f_{92,left}(z)=0.000341848-0.000278089z-0.0000237646z^2$$

Right fitting curve $$f_{92,right}(z)=0.0630784-0.0103445z+0.000380299z^2$$

Minimal position of water pressure difference $$f_{92,left}(z)=f_{92,right}(z)\rightarrow Z=12.4565\pm j0.315281$$

Minimal value of water pressure difference $$P_{min}=f_{92}(12.4565\pm j0.315281)=-0.00680723\pm j0.000274338$$

Figure 17:
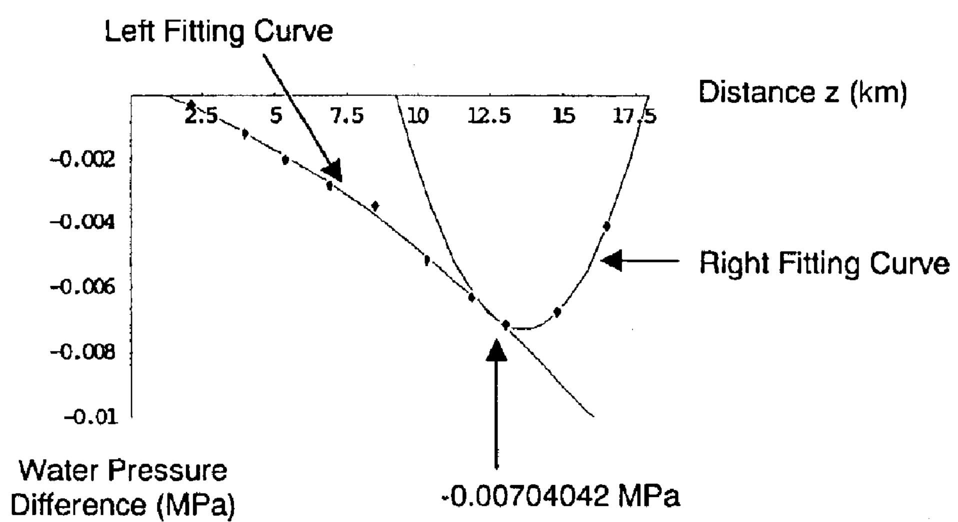
FIG. 17 is a graph showing a fitting curve in a third case (iii) in Embodiment C (The branch pipeline $b_9$ is ruptured.) of the modified method of estimating the ruptured position.

FIG. 17 shows the case of the above (iii). The minimum value of the water pressure difference of the data is −0.00713 MPa. The fitting curves $f_{93,left}(z)$ and $f_{93,right}(z)$ are determined with the assumption that the minimum data of water pressure difference is handled as the upstream and the downstream data. The distance z (12.1653 and 12.8284) of the point of intersection of the both fitting curves is obtained. Then, third minimal values of water pressure difference, that is, $P_{min}$=P(12.8284)=−0.00704042 MPa and $P_{min}$=P(12.1653)=−0.00648378 MPa are obtained. Associated expressions and results of the calculation are shown in Expressions 9.

Expressions 9

Left fitting curve $$f_{93,left}(z)=0.000414769-0.000308758z-0.0000212333z^2$$

Right fitting curve $$f_{93,right}(z)=0.063078-0.0103445z+0.000380299z^2$$

Minimal position of water pressure difference $$f_{93,left}(z)=f_{93,right}(z)\rightarrow Z=12.1653 \text{ and } z=12.8284$$

Minimal values of water pressure difference $$P_{min}=f_{93}(12.8284)=-0.00704042 \text{ MPa}$$

$$P_{min}=f_{93}(12.1653)=-0.00648378 \text{ MPa}$$

In this case, the values of $P_{min}$ of both solutions are greater than the minimum value of water pressure difference −0.00713 MPa, and accordingly rejected.

Results of Estimation in Embodiment C

Out of the above-described cases (i), (ii) and (iii) (corresponding to FIGS. 15, 16, and 17), the estimated value of the case (ii) is rejected in a physical viewpoint because it is a complex number, the solution of the case (iii) is rejected due to the above-described reason, and thus the estimated result of the case (i) is employed. This solution is extremely close to the junction position (z=13.9 km) of the branch pipeline $b_9$ set by the model. Therefore, $$z=13.9583 \text{ km}$$

that is estimated by (i) is determined to be the estimated position of the junction point of the ruptured branch pipeline.

According to the present invention, as described above, estimation of the location of damage in a water pipeline has been realized. Thus, a waterworks company can suitably dispatch a workforce to locations of damage for restoration.

Further, by the modified method employing calculation that minimizes the estimated value of the minimal value of water pressure difference, the estimated value of the minimal value of water pressure difference gives a value closest to the junction position of the branch pipeline used in the model in any case that the branch pipeline $b_6$, the branch pipeline $b_3$, or the branch pipeline $b_9$ has been ruptured.

Modified Examples

To the embodiments described above in detail, various modifications can be carried out within the scope of the present invention. Amounts of change (pressure difference) may be obtained at respective measuring points instead of the center and then collected. Since the above-described sensors are only required essentially to be able to measure changes in the flow rate, flowmeters (ultrasonic type, watermill type, pitot-tube type, electromagnetic type, or other types of flowmeters), that can be installed or are already installed, can be used. Taking installation into consideration, water pressure meters are practical because flow rate can be estimated by water pressure.

What is claimed is:

1. A method of estimating the location of a sudden leak in either a trunk line or locating the junction of a branch line containing a sudden leak in a water feed pipe line network, comprising the steps of:

(a) detecting a leak by comparing a measured pressure and previous measured pressure at each sensor location to determine if the amount of pressure difference at any arbitrary sensor exceeds a predetermined value;

(b) calculating an upstream fitting curve based on the pressure differences measured by a plurality of sensors, where the amount of pressure difference between the source and the leak gradually increases when measured from a water supply source;

(c) calculating a downstream fitting curve based on the pressure differences measured by a plurality of sensors, where the amount of pressure difference between the leak and the end of the trunk line gradually decreases when measured from a water supply source; and (d) estimating the location of the sudden leak in the trunk line or the branch line by calculating a point of intersection of the two fitting curves.

2. A method of estimating the location of the leak in the water feed pipeline network according to claim 1, wherein in a case that a leak at a junction section of a branch pipeline or a leak in a part downstream of the junction section of the branch pipeline is estimated from the position at which the amount of a pressure difference becomes the maximum, the method identifies one or more branch pipelines in the order of being closer to the estimated distance at which the amount of the difference becomes the maximum.

3. A method of estimating the location of the leak in the water feed pipeline network according to claim 1, wherein in a case that a leak of a trunk line is estimated from the position at which the amount of a pressure difference becomes the maximum, the position at which the amount of the difference becomes the maximum is estimated to be the position of a leak of the trunk line.

4. A method of estimating the location of the leak in the water feed pipeline network according to claim 1, wherein each sensor is located at a position at which an air valve or a fire hydrant is provided in the water supply and distribution pipeline network.

5. A method of estimating the location of the leak in the water feed pipeline network according to claim 1, wherein data at a point at which the amount of the difference at each measuring point becomes the maximum is used as data that forms either the fitting curve for the region where the amount of the difference gradually increases from the supply source of the water or the fitting curve for the region where the amount of the difference gradually decreases to the end of trunk line.

6. A method of estimating the location of the leak in the water feed pipeline network according to claim 1, comprising the steps of:

calculating a first value of pressure difference, the first value of pressure difference being obtained from a point of intersection of the fitting curve for the region where the amount of the difference gradually increases from the supply source of the water, wherein the data at a point at which the amount of the difference at each measuring point becomes the maximum is used as data to determine the fitting curve for the region where the amount of the difference increases, and the other fitting curve;

calculating a second value of pressure difference, the second value of pressure difference being obtained from a point of intersection of the fitting curve for the region where the amount of the difference gradually decreases from the supply source of the water, wherein the data at the point at which the amount of the difference at each measuring point becomes the maximum is used as data to determine the fitting curve for the region where the amount of the difference decreases, and the other fitting curve;

calculating a third value of pressure difference, the third value of pressure difference being obtained from a point of intersection of the two fitting curves, wherein the data at the point at which the amount of the difference at each measuring point becomes the maximum is used as both data to form the fitting curve for the region where the amount of the difference gradually increases from the supply source of the water and data to form the fitting curve for the region where the amount of the difference gradually decreases to the end of trunk line;

comparing the first, the second, and the third values of pressure difference and selecting a distance at which pressure difference is greatest; and determining the distance at which pressure difference is greatest as the location of the leak.

7. A method of estimating the location of the leak in a water feed pipeline network according to claim 6, further comprising the step of:

calculating a pipe pressure that corresponds to the distance at which pressure difference is greatest, wherein the pipe pressure is calculated from the distance, and the distance corresponds to the point of intersection of the two fitting curves in the case of claim 6.

* * * * *